(12) United States Patent
Yakushidoh et al.

(10) Patent No.: US 8,541,097 B2
(45) Date of Patent: *Sep. 24, 2013

(54) POLYESTER LAMINATED FILM AND TRANSFER FOIL

(75) Inventors: Kenichi Yakushidoh, Otsu (JP); Kokichi Hashimoto, Otsu (JP); Masahiro Kimura, Kyoto (JP)

(73) Assignee: Toray Industries, Inc. (JP)

( * ) Notice: Subject to any disclaimer, the term of this patent is extended or adjusted under 35 U.S.C. 154(b) by 196 days.

This patent is subject to a terminal disclaimer.

(21) Appl. No.: 13/338,312

(22) Filed: Dec. 28, 2011

(65) Prior Publication Data

US 2012/0100370 A1    Apr. 26, 2012

Related U.S. Application Data

(62) Division of application No. 12/092,843, filed as application No. PCT/JP2006/322240 on Nov. 8, 2006, now Pat. No. 8,114,504.

(30) Foreign Application Priority Data

Nov. 8, 2005    (JP) ................................. 2005-323230

(51) Int. Cl.
*B32B 7/02* (2006.01)
*B32B 27/06* (2006.01)
*B32B 27/08* (2006.01)
*B32B 27/36* (2006.01)

(52) U.S. Cl.
USPC ......................... 428/212; 428/195.1; 428/480

(58) Field of Classification Search
None
See application file for complete search history.

(56) References Cited

U.S. PATENT DOCUMENTS

| | | | |
|---|---|---|---|
| 4,011,358 A | 3/1977 | Roelofs | |
| 4,375,494 A | 3/1983 | Stokes | |
| 4,536,434 A | 8/1985 | Magnotta | |
| 4,555,436 A | 11/1985 | Geurtsen et al. | |
| 4,734,335 A | 3/1988 | Monzer | |
| 4,927,709 A | 5/1990 | Parker et al. | |
| 4,935,300 A | 6/1990 | Parker et al. | |
| 5,104,719 A | 4/1992 | Kamen et al. | |
| 5,292,471 A * | 3/1994 | Ito et al. | 264/173.16 |
| 5,648,035 A | 7/1997 | Okamoto et al. | |
| 5,759,756 A | 6/1998 | Laney et al. | |
| 5,824,176 A | 10/1998 | Stein et al. | |
| 6,420,019 B1 | 7/2002 | Peiffer et al. | |
| 6,660,354 B2 | 12/2003 | Suwa et al. | |
| 6,855,400 B1 | 2/2005 | Andreis et al. | |
| 7,312,293 B2 | 12/2007 | Beppu et al. | |
| 7,407,712 B2 | 8/2008 | Matsumoto et al. | |
| 2005/0031822 A1 | 2/2005 | Aihara et al. | |
| 2009/0117395 A1 * | 5/2009 | Yakushidoh et al. | 428/458 |

FOREIGN PATENT DOCUMENTS

| | | | |
|---|---|---|---|
| JP | 4-33854 A | | 2/1992 |
| JP | 04-070333 A | | 3/1992 |
| JP | H05-131601 A | | 5/1993 |
| JP | 06-210799 | * | 8/1994 |
| JP | 06-210799 A | | 8/1994 |
| JP | 6-210799 A | | 8/1994 |
| JP | 06-320615 | * | 11/1994 |
| JP | 06-320615 A | | 11/1994 |
| JP | 6-320615 A | | 11/1994 |
| JP | 10-017683 A | | 1/1998 |
| JP | 11-269283 A | | 10/1999 |
| JP | 2000-103000 A | | 4/2000 |
| JP | 3090911 B2 | | 7/2000 |
| JP | 2000-238070 | | 9/2000 |
| JP | 2001-270055 A | | 10/2000 |
| JP | 2001-322219 A | | 11/2001 |
| JP | 2003-94567 A | | 4/2003 |
| JP | 2004-106411 A | | 4/2004 |
| JP | 2004-174890 A | | 6/2004 |
| JP | 2004-188708 A | | 7/2004 |
| JP | 2004-231727 A | | 8/2004 |
| JP | 2009-078561 | * | 4/2009 |
| WO | 03/045690 A1 | | 6/2003 |

\* cited by examiner

*Primary Examiner* — Vivian Chen
(74) *Attorney, Agent, or Firm* — DLA Piper LLP (US)

(57) ABSTRACT

A polyester laminated film includes at least a polyester layer, and a highly crystalline polyester layer including a highly crystalline polyester having a crystallinity parameter ΔTcg of 35° C. or lower, wherein both the polyester layer and the highly crystalline polyester layer have a planar orientation coefficient of 0.00 to 0.03.

5 Claims, No Drawings

POLYESTER LAMINATED FILM AND TRANSFER FOIL

RELATED APPLICATIONS

This is a divisional of U.S. Ser. No. 12/092,843, filed May 7, 2008, U.S. Pat. No. 8,114,504, which is a §371 of International Application No. PCT/JP2006/322240, with an international filing date of Nov. 8, 2006 (WO 2007/055225 A1, published May 18, 2007), which is based on Japanese Patent Application No. 2005-323230, filed Nov. 8, 2005.

TECHNICAL FIELD

This disclosure relates to a polyester laminated film for forming, which is excellent in mold releasability, printability and thermoformability, and a transfer foil.

BACKGROUND

There has been known a technique using a film for forming or a transfer foil in which a member having a shape, which is not easily decorated by direct printing, is decorated by integrally connecting a printed film to the surface of the member.

It is proposed to use, as a conventional film for forming and a film for a transfer foil, a biaxially oriented polyester film (see, for example, Japanese Unexamined Patent Publication (Kokai) No. 06-210799). It is proposed to use a polyester film haying forming stress within a specific range and to use a polyester haying lower forming stress than that of a biaxially oriented PET for the purpose of improving thermoformability, particularly a copolyester (see Japanese Patent No. 3,090,911). However, in the method using a biaxially oriented polyester film, the biaxially oriented polyester film is insufficient in thermoformability against transfer to a member having a complicated shape. In the method using a copolyester, the copolyester is excellent in thermoformability but is inferior in heat resistance since it has a low melting point, and thus peel marks may occur in the mold releasing step. Also, smoothness of the surface of the film is deteriorated by a solvent, for example, ethyl acetate or methyl ethyl ketone, contained in a printing inks, thus causing a problem that printing defects may occur. A film having excellent mold releasability, printability and thermoformability has been required as compared with these films.

Thus, there is proposed a laminated film, which satisfies mold releasability, printability and thermoformability, obtained by laminating a polyester film having excellent thermoformability with a polyolefin film having excellent mold releasability and resistance to organic solvents (see Japanese Unexamined Patent Publication (Kokai) No. 2004-188708). However, this laminated film had a problem such as high production cost since it requires the step of laminating a polyester film with a polyolefin film and is inferior in recyclability.

It could therefore be advantageous to provide a polyester laminated film for forming, which satisfies mold releasability, printability and thermoformability aspects, and is also excellent in cost performance.

SUMMARY

We provide a polyester laminated film comprising at least a polyester layer, and a highly crystalline polyester layer comprising a highly crystalline polyester having a crystallinity parameter $\Delta Tcg$ of 35° C. or lower, wherein both the polyester layer and the highly crystalline polyester layer have a planar orientation coefficient of 0.00 to 0.03.

We thus provide a polyester laminated film comprising at least a polyester layer, a highly crystalline polyester layer made of a highly crystalline polyester having a crystallinity parameter $\Delta Tcg$ of 35° C. or lower, and a release layer laminated in this order, wherein the contact angle between the surface of the release layer and water in an atmosphere at room temperature of 23° C. and humidity of 65% is 85° or more.

We also include a transfer foil comprising a release layer of the polyester laminated film, and a top coat layer, a printing layer and an adhesive layer formed on the polyester laminated film in this order.

A laminated film having excellent mold releasability, printability, thermoformability and cost performance can be obtained. More specifically, regarding mold releasability, peel marks are less likely to form during the mold releasing step since the laminated film is excellent in mold releasability with a material to be transferred. Regarding printability, various printing inks can be used since the laminated film is excellent in resistance to organic solvents such as a solvent, particularly ethyl acetate or methyl ethyl ketone, contained in a printing ink. The laminated film is preferably used as in mold transfer foils used after printing and forming, and transfer foils for transfer processing of printing of automotive interior/exterior components, bathroom panels, components for household electrical appliances and packaging containers since it is excellent in thermoformability such as deep draw formability and conformability of a material to be transferred to a surface shape.

DETAILED DESCRIPTION

We intensively studied about a polyester laminated film for forming, which solves the above problems, namely, all of mold releasability, printability and thermoformability, and is also excellent in cost performance and found that these problems can be solved at once by forming a specific release layer haying a high contact angle with water on a specific laminated film (hereinafter referred to as a base material film) as a base material.

The base material film is obtained by laminating a highly crystalline polyester layer made of a highly crystalline polyester having a crystallinity parameter $\Delta Tcg$ of 35° C. or lower on at least one surface of a polyester layer. Resistance to organic solvents to a solvent contained in an ink is enhanced, and thus printability is improved. It is particularly preferred that the base material film has a film configuration of A/B/A (where A denotes a highly crystalline poly-ester layer and B denotes a polyester layer) in which the highly crystalline polyester layer is laminated on both surfaces of the polyester layer in view of suppression of a curling phenomenon caused by a difference in expansion/contraction stress of each layer due to temperature and humidity, and handleability of the film. A/B/A means a film configuration of two kinds of three layers (where A denotes a highly crystalline polyester layer and B denotes a polyester layer) in which each layer is laminated in this order. However, the film configuration may be a film configuration of A/B in which the highly crystalline polyester layer is laminated on only one surface of the polyester layer, or may be a film configuration of A/B/A/B in which the polyester layer is further laminated.

In the base material film, a crystallization index Xs of the highly crystalline polyester layer and a crystallization index Xc of the polyester layer preferably satisfy the following relation: $Xs-Xc \geq 4(\%)$, more preferably $Xs-Xc \geq 6(\%)$, and particularly preferably Xs−Xc≧8(%). It is not-preferred that the value of Xs−Xc deviates from the above ranges, since printability may deteriorate.

The crystallization index of each laminated layer can be calculated by (Equation 1) from data obtained using a differential scanning calorimetry (DSC). The crystallization index Xc of the polyester layer can be calculated by analyzing after removing the layer other than the polyester layer using a file or a cutter knife. Regarding calculation of the crystallization index Xs of the highly crystalline polyester layer, when the objective highly crystalline polyester layer is coated with a release layer and is not exposed to the surface, a release layer is removed using a file or a cutter knife until the objective highly crystalline polyester layer is exposed to the surface and then the exposed highly crystalline polyester layer is scraped off using the file or cutter knife, and thus the crystallization index can be calculated by analyzing the resulting sample:

Crystallization Index: $X(\%)=(Sm-Sc)/Sm \times 100$  (Equation 1), where X denotes the crystallization index, Sc denotes the exothermic amount upon crystallization, and Sm denotes the endothermic amount upon fusion.

The polyester used in the polyester layer and the highly crystalline polyester layer of the base material film constituting the laminated film is preferably a polymer composed mainly of a dicarboxylic acid component and a glycol component.

It is possible to use, as the dicarboxylic acid component, isophthalic acid, terephthalic acid, diphenyl-4,4'-dicarboxylic acid, 2,6-naphthalenedicarboxylic acid, naphthalene-2,7-dicarboxylic acid, naphthalene-1,5-dicarboxylic acid, diphenoxyethane-4,4'-dicarboxylic acid, diphenylsulfone-4,4'-dicarboxylic acid, diphenylether-4,4'-dicarboxylic acid, malonic acid, 1,1-dimethylmalonic acid, succinic acid, glutaric acid, adipic acid, sebacic acid and decamethylene-dicarboxylic acid.

It is possible to use, as the glycol component, an aliphatic glycol such as ethylene glycol, tetramethylene glycol, hexamethylene glycol, neopentyl glycol or 1,3-propanediol, an alicyclic glycol such as cyclohexane dimethanol; an aromatic glycol such as bisphenol A or bisphenol S; polyethylene glycol, polypropylene glycol, polytetramethylene glycol and polyethylene glycol propylene glycol copolymer.

Specific examples of the polyester, which can be preferably used as the polyester of the polyester layer and highly crystalline polyester layer, include polyethylene terephthalate (PET), polypropylene terephthalate (PPT), polybutylene terephthalate (PBT), polyhexamethylene terephthalate (PHT), polyethylene naphthalate (PEN), polypropylene naphthalate (PPN), polybutylene naphthalate (PBN), polycyclohexanedimethylene terephthalate (PCT) and polyhydroxy-benzoate (PHB). Two or more kinds of these polyesters can also be used in combination.

It is necessary that the highly crystalline polyester constituting the highly crystalline polyester layer of the base material film has a crystallinity parameter ΔTcg of 35° C. or lower. Crystallinity parameter means the difference (ΔTcg) between a cold crystallization temperature (Tc) and a glass transition temperature (Tg) observed in the temperature rising process of differential scanning calorimetry (DSC). As the value of ΔTcg becomes smaller, crystallization occurs more easily. By crystallizing the highly crystalline polyester of the highly crystal-line polyester layer, excellent printability and transferability can be exhibited. In view of further enhancing crystallinity of the highly crystalline polyester layer, ΔTcg is more preferably 25° C. or lower, and particularly preferably 20° C. or lower.

The composition of the highly crystalline polyester layer preferably contains 50 to 100% by mass of a polyester selected from PPT, PBT, PPN and PBN. The content of these polyesters is preferably from 70 to 100% by mass, and particularly preferably 90 to 100% by mass. When the content of these polyesters is less than 50% by mass, it is difficult to design the crystallinity parameter ΔTcg to 35° C. or lower and it is difficult to achieve the crystallization index required to obtain satisfactory printability and transferability. The polyester is most preferably PBT since it has high crystallinity. The highly crystalline polyester layer may contain 0 to 50% by mass of other components. The other component is preferably a polyester other than the above specific polyesters, and more preferably PET. As used herein, PET includes a copolymerized PET, for example, a copolymerized PET obtained by copolymerizing with about 5 to 30 mol % of isophthalic acid.

In view of satisfying all of thermoformability, heat resistance and productivity, the glass transition temperature of the polyester constituting the polyester layer of the base material film is preferably within a range from 60 to 78° C. When the glass transition temperature of the polyester used in the polyester layer is lower than the above range, heat resistance and productivity may deteriorate. In contrast, when the glass transition temperature is higher than the above range, thermoformability may deteriorate.

In the polyester constituting the polyester layer, the content of the naphthalenedicarboxylic acid component and/or the terephthalic acid component in the entire dicarboxylic acid component is preferably 90 mol % or more, and it is preferred that the ethylene glycol component in the entire glycol component is within a range from 20 to 99.9 mol % and also the content of the 1,3-propanediol and/or 1,4-butanediol components is within a range from 0.1 to 80 mol %. It is not preferred that the composition of the polyester is not within the above range since the glass transition temperature may deviate from the above preferred range and heat resistance, productivity and thermoformability may deteriorate. Specific examples of the polyester with such a composition include a mixture or a copolymer of polyesters selected from PET, PEN, PPT, PBT, PPN and PBN.

The polyester with a specific composition can be obtained by a known method such as a method of blending two or more kinds of polymer pellets, supplying the mixed polymer pellets to an extruder, kneading them in the extruder to obtain a polyester with the composition of optional components (a dry blending method), a method of polymerizing, two or more kinds of monomers to obtain a polyester of optional components (a copolymerization method) and a method of using the dry blending method in combination with the copolymerization method. In view of production cost, productivity and heat resistance of the polymer, the dry blending method is preferably used.

In the case of producing the polyester, conventionally used reaction catalysts and discoloration inhibitors can be used. As the reaction catalyst, for example, alkali earth metal compounds, zinc compounds, lead compounds, manganese compounds, cobalt compounds, aluminum compounds, antimony compounds and titanium compounds can be used. As the discoloration inhibitor, for example, phosphorus compounds can be used. In any stage before the completion of the production of the polyester, antimony compounds, germanium compounds or titanium compounds are preferably added as the reaction catalyst. As the method of adding the reaction catalyst, for example, a method of adding a powder of the reaction catalyst as is, or a method of adding the reaction catalyst after dissolving in the glycol component as a starting material of the polyester can be used.

The antimony compound is not specifically limited and, for example, antimony oxides such as antimony trioxide, and antimony acetate can be used.

The titanium compound is not specifically limited and, for example, alkyl titanate compounds such as tetraethyl titanate, and tetrabutyl titanate, and complex oxides of titanium and an element selected from silicon, zirconium and aluminum can be used.

When the polyester used in the polyester layer and the highly crystalline polyester layer of the base material film is used in combination with two or more kinds of polyesters, it is preferred to satisfy the following relation: $M/P \leqq 1$. In the relation, M denotes the concentration (mmol %) of a catalytic metal element remaining in the polyester, and P denotes the concentration (mmol %) of a phosphorus element remaining in the polyester. M and P means the concentration to one repeating unit (mol) of the polyester. M/P is more preferably 0.0001 or more and less than 1, and particularly preferably 0.001 or more and 0.8 or less.

By controlling to satisfy the relation $M/P \leqq 1$, transesterification of two or more kinds of polyesters can be suppressed and thermostability of the polyester is enhanced, and thus a decrease in the melting point through a heat treatment such as melt-extrusion can be suppressed. As a result, heat resistance, resistance to organic, solvents and printability of the polyester can be improved and also variation in quality can be reduced.

The phosphorus compound is not specifically limited, and is preferably phosphoric acid, phosphorous acid of phosphate ester. It is preferred to use, among these phosphorus compounds, a phosphorus compound having a molecular weight of 300 or more, and more preferably 400 or more, in view of suppressing bleeding-out in the production of the film. Examples of the phosphorus compound having a molecular weight of 300 or more include stearylphosphoric acid, triphenyl phosphate, tricresyl phosphate, trixylenyl phosphate and cresyldiphenyl phosphate. In view of suppression of bleeding-out, stearylphosphoric acid is particularly preferably used.

In view of thermostability and color tone, the content (additive amount) of the phosphorus compound is preferably from 20 to 1,000 mmol %, more preferably from 90 to 900 mmol %, and particularly preferably from 120 to 800 mmol %, in terms of the phosphorus element based on one repeating unit (mol) of the polyester.

The method of adding such a phosphorus compound may be either a method of adding upon polymerization or a method of adding by supplying to an extruder together with a polymer. When a large amount of a phosphorus compound is added upon polymerization, the polymerization reaction is usually inhibited, and thus the method of adding by supplying to an extruder together with a polyester is preferred.

It is preferred to add antistatic agents to, or to copolymerize antistatic agents with polyesters used in the polyester layer and the highly crystalline polyester layer used in the base material film. As the antistatic-agent, various known antistatic agents such as anionic, cationic, nonionic and amphoteric antistatic agents can be used. In view of heat resistance, anionic antistatic agents such as sodium alkyl sulfonate or sodium alkylbenzene sulfonate are preferably used.

It is preferred to add these antistatic agents, together with antioxidants, upon polymerization in view of handleability. As the antioxidant, various known antioxidants such as phenolic antioxidants, phosphite-based antioxidants and thioether-based antioxidants can be used. These compounds may be used by mixing a plurality compounds.

To the polyesters used in the polyester layer and the highly crystalline polyester layer of the base material film, various particles can be added according to the purposes and applications. The particles are not specifically limited as long as they are inert to the polyester, and examples thereof include inorganic particles, organic particles, crosslinked polymer particles, and internal particles produced in the polymerization system. Two or more kinds of these particles may be added. The amount of these particles is preferably from 0.01 to 10% by mass, and more preferably from 0.05 to 3% by mass;

In view of improving handleability by imparting, easy slipperiness to the film, the number, average particle diameter of the particles to be added is preferably from 0.001 to 20 µm, and more preferably from 0.01, to 10 µm. It is not preferred that the number average particle diameter is more than 20 µm since defects of the film may occur and thermoformability may deteriorate. It is not preferred that the number average particle diameter is less than 0.001 µm since sufficient easy slipperiness may not be exhibited.

When the configuration of the base material film is a configuration of three or more layers of highly crystalline polyester layer/polyester layer/highly crystalline polyester layer, particles are preferably added to only the surface layer in view of production cost and productivity for the purpose of imparting easy slipperiness. Usually, easy slipperiness can be obtained by adding particles to the surface layer since easy slipperiness exerts a large influence on the shape of the surface of the film.

The kind of the inorganic particles is not specifically limited and it is possible to use various carbonates such as calcium carbonate, magnesium carbonate and barium carbonate; various sulfates such as calcium sulfate and barium sulfate; various complex oxides such as kaolin and talc; various phosphates such as lithium phosphate, calcium phosphate and magnesium phosphate; various oxides such as silicon oxide, titanium oxide and zirconium hydroxide; and various salts such as lithium fluoride.

As the organic particles, calcium oxalate, and terephthalates of calcium, barium, zinc, manganese and magnesium can be used.

Examples of the crosslinked polymer particles include homopolymers or copolymers of vinyl-based monomers such as divinylbenzene, styrene, acrylic acid and methacrylic acid. In addition, organic fine particles of polytetrafluoroethylene, a benzoguanamine resin, a thermocurable epoxy resin, an unsaturated polyester resin, a thermocurable urea resin and a thermocurable phenol resin are also preferably used.

As the internal particles to be produced in the polymerization system, particles produced by a known method of adding an alkali metal compound or an alkali earth metal compound in the reaction system and further adding a phosphorus compound are used.

The polyesters used in the polyester layer and the highly crystalline polyester layer of the base material film may be mixed with an appropriate amount of known additives, for example, flame retardants, themostabilizers, antioxidants, ultraviolet absorbers, antistatic agents, plasticizers, tackifiers, defoamers such as polysiloxane, and colorants such as pigments or dyes, if necessary.

The inherent viscosity of the polyesters used in the polyester layer and the highly crystalline polyester layer of the base material film is preferably within a range from 0.6 to 1.3 dl/g, more preferably from 0.65 to 1.2 dl/g, and particularly preferably from 0.7 to 1.1 dl/g. When the inherent viscosity is less than 0.6 dl/g, thermoformability of the laminated film deteriorates. In contrast, when the inherent viscosity is more than 1.3 dl/g, productivity may decrease and thickness irregularity of the film may become drastic.

The difference in the inherent viscosity between the polyester used in the polyester layer and the polyester used in the highly crystalline polyester layer is preferably less than 0.4 dl/g, more preferably less than 0.2 dl/g, and particularly preferably less than 0.1 dl/g. When the difference in the inherent viscosity is within the above ranges, thickness irregularity of each layer of the base material film in a width direction may be less likely to arise and productivity is improved.

The melting point of the polyesters used in the polyester layer and the highly crystalline polyester layer of the base material film is preferably within a range from 240 to 270° C. A temperature lower than the above range is not preferred since heat resistance may deteriorate. A melting point higher than the above range is not preferred since thermoformability may deteriorate.

Melting point means the crystal fusion peak attributed to the polymer and is the minimum point of an endothermic curve upon crystal fusion determined from a DSC curve when measured under a nitrogen atmosphere at a temperature raising rate of 20° C./min using a differential scanning calorimeter (DSC), namely, the point where the derivative becomes 0. When the polymer has plural crystal fusion peaks, the main fusion peak having the largest fusion heat quantity is taken as a melting point of the polymer.

It is preferred that the DSC curve of each polyester used in the polyester layer and the highly crystalline polyester layer of the base material film shows substantially a single crystal fusion peak. A polyester having two or more crystal fusion peaks of DSC is sometimes inferior in thermoformability since the molecular structure is not uniform. Herein, a shoulder peak (the minimum point of a peak) in which the fusion heat quantity which is partially overlapped with one endothermic curve is 2 J/g or more is also included in a peak of a crystal fusion curve.

The amount of a carboxyl end group of the polyesters used in the polyester layer and the highly crystalline polyester layer of the base material film is preferably 30 eq/t or less, more preferably 25 eq/t or less, and particularly preferably 10 eq/t or less. When the amount of the carboxyl end group is more than 30 eq/t, resistance to hydrolysis of the film deteriorates and heat deterioration may occur.

The entire thickness of the base material film is preferably within a range from 10 to 600 μm, more preferably 20 to 400 μm, and particularly preferably from 40 to 300 μm. It is not preferred that the entire thickness of the base material film is less than the lower limit of the above ranges since rigidity, production stability and flatness of film deteriorate and also wrinkles may be formed upon forming. When the entire thickness of the base material film is more than the upper-limit of the above range, handleability and thermoformability may deteriorate.

In view of improving all of printability, transferability and thermoformability, the thickness of one highly crystalline polyester layer is preferably from 30% to 0.1% and is 2 μm or more based on the entire thickness of the base material film, and more preferably from 10% to 0.3% and is 4 μm or more based on the entire thickness of the base material film. When the thickness of the highly crystalline polyester layer is too small, printability and transferability may deteriorate. In contrast, when the thickness of the highly crystalline polyester layer is top large, thermoformability may deteriorate.

In view of thermoformability, each planar orientation coefficient of the polyester layer and the highly crystalline polyester layer of the base material film is preferably within a range from 0.00 to 0.05, and more preferably from 0.00 to 0.03. The planar orientation coefficient is particularly preferably from 0.00 to 0.01. The smaller the planar orientation coefficient, the better thermoformability such as deep draw formability and conformability of a material to be transferred to a surface shape becomes. The base material film is preferably a non-drawn film since the planar orientation coefficient increases when the film is drawn.

Planar orientation coefficient means fn represented by the following (Equation 2) and expresses the orientation degree of the surface of the film:

$$\text{Planar Orientation coefficient } fn = (Nx+Ny)/2 - Nz \quad \text{(Equation 2)},$$

where Nx, Ny and Nz respectively represent a refractive index in a longitudinal direction, a refractive index in a width direction and refractive index in a thickness direction, and each refractive index is a value measured using an Abbe refractometer.

When it is difficult to measure the refractive index using Abbe refractometer because the film is opaque, the planar orientation coefficient can be measured by a method of measuring the orientation degree using infrared absorption spectrometry, X-rays or the like.

When the base material film has a cofiguration of highly crystalline polyester layer/polyester layer/highly crystalline polyester layer, for example, the refractive index of the polyester layer can be measured by scraping off the highly crystalline polyester layer as one surface layer using a fine sandpaper of #1,000 to #1,500 mesh, thereby exposing the polyester layer.

The base material film can be produced by a known method such as a coextrusion method, an extrusion lamination method, an extrusion coating method, a fusion method, and a combination thereof. In view of handleability, productivity and production cost of the film, the coextrusion method is preferably used.

The coextrusion method is a method of supplying polyesters constituting the respective layers to one die from plural extruders and simultaneously extruding them to produce a laminated film, and includes a T-die method and an inflation method. Although, the base material film can be produced by either a T-die method or an inflation method, in view of productivity, the T-die method is preferably used. Typical examples of the T-die method include a laminar flow method using a single manifold die, an in-die lamination method using a multi-manifold die, and an out-die lamination method using a dual slot die. The base material film can be produced by an method. In view of small unevenness of the thickness of the layer in the width direction and good productivity, a laminar flow method an in-die lamination method can be preferably used. When the difference in viscosity of the polyester between the polyester layer and the highly crystalline polyester layer is large, an in-die lamination method can be particularly preferably used.

When the base material film is produced by the T-die method, the base material film can be produced by taking up a multi-layered sheet coextruded through dies around a cast drum. The temperature of the cast drum is particularly preferably set to a temperature close to the upper limit of the temperature range at which the molten sheet extruded through the die does not adhere to the cast drum. By adjusting the temperature of the cast drum, crystallization of the polyester in the highly crystalline polyester layer is allowed to proceed. When the temperature of the cast drum is too low, crystallization of the polyester of the highly crystalline polyester layer does not proceed easily, and thus printability and transferability may deteriorate. In contrast, when the temperature of the cast drum is too high, the film may adhere to the cast drum and thus productivity may deteriorate. Crystallization of the polyester of the polyester layer may increase stress upon forming and deteriorate thermoformability.

Regarding setting of the temperature of the casting drum, a casting method described in paragraphs [0017] to [0019] of Japanese Unexamined Patent Publication (Kokai) No. 2000-103000 is also preferred. It is also possible to use a method of crystallizing a surface layer more specifically by a casting method in which the surface temperature of the cast drum when the molten film is contacted with the cast drum is set to the temperature of the cast drum when the molten film is contacted with the cast drum us set to the temperature of the Tg of the polyester of the highly crystalline polyester layer or higher, and the surface temperature of the cast drum immediately before peeling from the cast drum is set to a temperature lass than Tg of the polyester of the highly crystalline polyester layer.

It is necessary that a release layer is formed on at least one surface of the highly crystalline polyester layer in polyester laminated film for forming (hereinafter simply referred to as a laminated film) in view of mold releasability. It is necessary that the contact angle of the surface of the release layer with water in a an atmosphere at room temperature of 23° C. and humidity of 65% is 85° or more in the laminated film. The contact angle with water is more preferably 95° or more, and particularly preferably 100° or more. When the contact angle of the surface of the release layer with water deviates from the above ranges, mold releasability required as the transfer foil cannot be obtained.

As the material of the release layer, one or more kinds selected from a long-chain alkyl acrylate resin, a silicone resin, a melamine resin, a fluororesin, a cellulose derivative, a-urea resin, a polyolefin resin and a paraffin-based releasant are preferably used.

The long chain alkyl acrylate resin used in the release layer is preferably a copolymerized acrylic resin of a long-chain alkyl acrylate monomer having a alkyl group 12 to 25 carbon atoms in the side chain and another monomer which is copolymerizable with this monomer. The copolymerization, the copolymerization amount is preferably from 35 to 85 % by mass, and more preferably from 60 to 80% by mass.

It is possible to preferably use, as the long-chain alkyl acrylate monomer, decyl acrylate, tridecyl acrylate, tetradecyl acrylate, acrylic pentadecyl, acrylate, hexadecyl acrylate, heptadecyl acrylate, octadecyl acrylate, nonadecyl acrylate, eicosyl acrylate, heneicosyl acrylate, docosyl acrylate, tricosyl acrylate, tetracosyl acrylate, pentacosyl acrylate, decyl methacrylate, eicosyl methacrylate and pentacosyl methacrylate.

It is particularly preferred to use an aqueous coating agent from an environmental point of view when a release layer is formed using such a long-chain alkyl acrylate resin. Therefore, it is preferred to copolymerize the long-chain alkyl acrylate resin with methyl acrylate, ethyl acrylate, butyl acrylate, 2-ethoxyethyl, acrylate, 2-methoxyethyl acrylate, 2-butoxyethyl acrylate, methyl methacrylate, ethyl methacrylate, acrylonitrile, methacrylonitrile, vinyl acetate, (meth)acrylic acid, styrene, itaconic acid, (meth)acrylamide, (meth)acrylic acid2-hydroxyethyl, diethylene glycol mono(meth)acrylate, N-methylol(meth)acrylamide, dimemylaminoethyl (meth) acrylate, diethylaminoethyl (meth)acrylate, (meth)acryloyloxyethylphosphate ester, sodium vinylsulfonate, sodium styrenesulfonate, or maleic anhydride so as to facilitate emulsification.

When an aqueous coating agent requiring the drying step at 100° C. or higher is used, heat in the drying step may cause the laminated film to become wavy, resulting in poor flatness. At this time, an undulation phenomenon of the film can be suppressed by setting the drying temperature to 90° C. or lower using a low boiling point solvent as a solvent of the releasant. For example, when the above long-chain alkyl acrylate resin is used, a solvent having a boiling point of 80° C., which utilizes the azeotropic effect of an isopropyl alcohol-aqueous system, can be preferably used.

A curable silicone is preferably used as a silicone resin which is used in the release layer. It is possible to use, as the curable silicone, any of addition reactive silicones such as a solvent addition type silicone and a non-solvent addition type silicone; condensation reactive silicones such as a solvent condensation type silicone and a non-solvent condensation type silicone; and active energy line curable silicones such as a solvent ultraviolet curable silicone, a non-solvent ultraviolet curable silicone and a non-solvent electron beam curable silicone. It is preferred to use a heavy-release type curable silicone as the curable silicone. These curable silicones can be used alone, or two or more kinds of them can be used in combination.

The addition reactive silicone includes, for example, a silicone in which a three-dimensional crosslinked structure is formed by reacting polydimethylsiloxane having a vinyl group introduced into the end with hydrodienesilane using a platinum catalyst thereby forming, a coating film.

The condensation reactive silicone includes, for example, a condensation reactive silicone which is crosslinked by dehydrocondensation between a silanol group (Si—OH group) in a base silicone polymer (for example, polydimethylsiloxane having an end —OH group) and a functional group of a crosslinking agent (for example, polydimethylsiloxane having a —H group at the end (hydrodienesilane)) in the presence of an organotin catalyst (for example, an organic tin acylate catalyst) to form a siloxane bond (Si—O—Si), thereby forming a three-dimensional cross-linked structure.

The active energy line curable silicone is typically an ultraviolet curable or electron beam curable silicone. The most basic silicone includes, for example, a radical addition type silicone in which the crosslinking reaction is carried out by adding a photopolymerization initiator to a siloxane having an alkenyl group and a mercapto group; a radical polymerization type silicone which is cured through radical polymerization by adding a photopolymerization initiator to a siloxane having a methacryl group and an acryl group; an addition reactive silicone in which vinylsiloxane is subjected to the hydrosilylation reaction in the presence of a platinum-based catalyst; and a cationic polymerization type silicone in which an onium salt photoinitiator is decomposed by ultraviolet light to form Broensted acid, thereby causing cleavage of an epoxy group, and thus crosslinking is performed. Of these silicones, a cationic polymerization type silicone is particularly preferably used since it has an epoxy group as a functional group and is excellent in adhesion to the film subjected to a corona treatment. In the case of the electron beam curable silicone, the crosslinking reaction is caused by a radical without using an initiator, like the ultra-violet, curable silicone, since an electron beam has stronger energy than that of ultraviolet light.

Specific examples of the ultraviolet curable silicone include Silicone TPR6500, TPR6501, UV9300, UV9315, UV9425, XS56-A1652,, XS56-A2775, XS56-A2982 and UV9430 manufactured by Toshiba Silicone Co., Ltd.; Silicone BY24-535, BY24-542, BY24-551A/B and BY24-538 manufactured by Dow Corning Toray Silicone Co., Ltd.; and Silicone X-62-7296, X-62-7305, KS-5504, KS-5505, KS-5514, X-62-5039, X-62-5040, KNS-5100, X-62-7028, KNS-5300, X-62-7540 and X-62-7192 manufactured by Shih-Etsu Chemical Co., Ltd.

Specific examples of the thermocurable silicone include Silicone KS-718, KS-708A, KS-774, KS-830, KS-775, KS-778, KS-779H, KS-847H, KS-847, KS-776, X-62-2422, X-62-2461, KS-3600 and KS-856 manufactured by Shin-Etsu Chemical- Co., Ltd.; Silicone DKQ3-202, DKQ3-203, DKQ3-204, DKQ3-205 and DKQ3-210 manufactured by Dow Corning Asia Ltd.; Silicone SRX-357, SRX-211, SREX211 and SP7243S manufactured by Dow Corning Toray Silicone. Co., Ltd.; and Silicone TPR-6700, TPR-6701, TPR-6721 and TPR-6720 manufactured by Toshiba Silicone; Co. Ltd. Of these curable silicones, a non-solvent type curable silicone, particularly a curable silicone capable of curing by irradiation with an active energy line is particularly preferred since the step of applying heat is riot required and deterioration of flatness of the film due to heat can be suppressed. When using those prepared by dissolving or dispersing, a curable silicone in a solvent, those prepared by dissolving or dispersing in a low boiling point solvent are preferable.

As the method of forming a release layer, a wire bar coating method, a doctor blade method, a microgravure coating method, a gravure roll coating method, a reverse roll coating method, an air knife coating method, a rod coating method, a die coating method, a kiss coating method, a reverse kiss coating method, an impregnation method, a curtain coating method and a spray coating method can be used alone or in combination. When the curable silicone is used, it is cured by irradiating with an active energy line or heating after coating on the surface of the highly crystalline polyester layer.

The thickness of the release layer is preferably 3 µm or less, and particularly preferably 1 µm or less. Although it depends on the thickness of the entire laminated film, it is not preferred that the thickness of the release layer is more than 3 µm since it becomes difficult to reuse the laminated film and recyclability deteriorates.

The laminated film can be recovered and reused as the polyester as the raw material since both the polyester layer and the highly crystalline polyester layer of the base material film are made of the polyester, and is also excellent in cost performance. For example, the recovered laminated film may be used after grinding and then mixing a fixed proportion of the resulting ground product with the polyester of the raw material. The influence of inclusion of the release layer can be ignored when the thickness of the release layer is within the above range. In view of recyclability, it is preferred that the polyester layer and the highly crystalline polyester layer of the base material film partially contains a common polyester. The common polyester is preferably a polyester selected from PET, PPT, PBT, PPN and PBN. Of these polyesters, PET and/or PBT are preferably as a common component of the polyester layer and the highly crystalline polyester layer.

In view of thermoformability, in the laminated film, tensile elongation at break at 80° C. is preferably 500% or, more, more preferably 800% or more, and particularly preferably 1,000% or more. Furthermore, stress at 500% elongation at 80° C. is preferably from 10 to 50 MPa, and more preferably from 15 to 30 MPa. It is preferred that the tensile elongation at break and stress at 500% elongation is within the above range since print misalignment may scarcely occur and also thermoformability is excellent.

In the laminated film, haze is preferably 10% or less. When the haze is more than 10%, productivity may deteriorate when used as a film for a transfer foil. It is not preferred that the transfer step employs the step of curing any transfer layer by irradiating ultraviolet light over a transfer foil since ultraviolet curing efficiency may become inferior. The haze is more preferably 7% or less, and particularly preferably 5% or less;

In the laminated film, a light transmittance is preferably 85% or more. When the light transmittance is less than 85%, productivity may deteriorate when used as a film for a transfer foil. It is not preferred that the transfer step employs the step of curing any transfer layer by irradiating ultraviolet light over a transfer foil laminated thereon since ultraviolet curing efficiency may become inferior. The light transmittance is more preferably 90% or more, and particularly preferably 93% or more.

In the transfer foil, a top coat layer, a printing layer and an adhesive layer are further formed an this order on the release layer on the laminated film. Such a transfer foil can be preferably used as a transfer foil for deep draw forming.

When used as a transfer foil, a transfer foil and a material to be transferred are integrated so as to bring an adhesive layer of the transfer, foil into contact with the material to be transferred, and then a base material film is removed. Thereby, a laminated film comprising a top coat layer, a printing layer and an adhesive layer is formed on the surface of the material to be transferred. This step is called a transfer step. A release layer is usually removed together with the base material film. The top coat layer, the printing layer and the adhesive layer in the edge portion, which are not contacted with material to be transferred in the transfer foil, are also removed together with the base material film.

After transfer, the top coat layer is located at the outermost surface of the material to be transferred, and plays a role of protecting the printing layer thereunder.

It is preferred to use, as the material of the top coat layer, an acrylic resin, a polyester-based resin, a polyvinyl chloride-based resin, a cellulose-based resin, a rubber-based resin, a polyurethane-based resin, a vinyl polyacetate-based resin, a vinyl chloride-vinyl acetate copolymer-based resin and an ethylene-vinyl acetate copolymer-based resin copolymer.

Examples of the method of forming a top coat layer include coating methods such as a foil coating method, a gravure coating method and a comma coating method; and printing methods such as a gravure printing method and a screen printing method.

A thermocurable resin, an ultraviolet curable resin or a heat ray curable resin is preferably used since the top coat layer constitutes the outermost surface of the material to be transferred. These resins may be cured before removing the laminated film in the transfer step, or may be cured after the transfer step, namely, after removing the laminated film. It is also preferred to add ultraviolet absorbers or ultraviolet reflecting agents to the top coat layer so as to improve weatherability. It is also preferred to use polyolefin-based resins so as to improve resistance to organic solvents.

It is preferred to use, as the material of the printing layer, a polyurethane-based resin, a vinyl-based resin, a polyamide-based resin, a polyester-based resin, an acrylic resin, a polyvinyl acetal-based resin, a polyester urethane-based resin, a cellulose ester-based resin, an alkyd-based resin and a thermoplastic elastomer-based resin. Also, a binder of a resin capable of forming a flexible coating film is used. It is particularly preferred to use a color ink containing pigments or dyes haying a proper color as a colorant.

As the method of forming a printing layer, a known method, can be used, and it is preferred to use printing methods such as an offset printing method, a gravure printing method and a screen printing method. When multicolored printing and gradation, color are required, an offset printing method and a gravure printing method are preferably used. In the case of a single color, coating methods such as a gravure coating method, a roll coating method and a comma coating method can also be employed. In the printing method, a pattern may be entirely or partially formed according to the pattern.

As the material of the adhesive layer, a heat-sensitive or pressure-sensitive adhesive is preferably used. When the material to be transferred is made of an acrylic resin, the acrylic resin is preferably used as the adhesive layer. When the material to be transferred is made of a polyphenylene oxide-polystyrenic resin, a polycarbonate-based resin, a styrene copolymer-based resin or a polystyrene-based resin, an acrylic resin, polystyrene-based resin and a polyamide-based resin, each having affinity with these resins, are preferably used as the adhesive layer. When the material to be transferred is made of a polypropylene-based resin, a chlorinated polyolefin-based resin, a chlorinated ethylene-vinyl acetate copolymer-based resin, a cyclized rubber and a coumarone indene-based resin are preferably used as the adhesive layer.

As the method for forming an adhesive layer, a known method can be used. For example, coating methods such as a roll coating method, a gravure coating method and a comma coating method, and printing methods such as a gravure printing method and a screen printing method.

The thickness of layers such as a top coat layer, a printing layer and an adhesive layer can be appropriately controlled to a proper thickness according to the shape, material and size of the material to be transferred.

The transfer foil may be provided with a hard coat layer, a weatherable layer, a flame retardant layer, a stain proof layer and an antibacterial layer. These layers can be formed by methods such as coating, coextrusion, heat lamination and dry lamination methods.

The material of the material to be transferred using the transfer foil is not specifically limited. When the material is used in automotive interior/exterior components, a polypropylene-based resin, an acrylic resin, a polystyrene-based resin, a polyacrylonitrile-styrene-based resin and a polyacrylonitrile-butadiene-styrene-based resin are preferably used.

EXAMPLES

Our laminated films will be described below by way of examples, but the disclosure is not limited by these examples. Various physical properties were measured by the following methods.

(1) Melting Point (Tm), Glass Transition Temperature (Tg), and Crystallinity Parameter (ΔTcg)

5 mg of a sample of each layer was collected from a laminated film by shaving off each layer. Using a differential scanning calorimeter Model DSCII manufactured by Seiko Instruments Inc., the peak temperature of an endothermic fusion curve obtained by heating within a range from −30 to 300° C. at a temperature raising rate of 20° C./min was taken as the melting point (Tm). Under the same measurement conditions, the glass transition temperature (Tg) and the crystallization temperature (Tc) were measured and then a crystallinity parameter (ΔTcg) was calculated from (Equation 3):

Crystallinity parameter: $\Delta Tcg = Tc - Tg$ (Equation 3).

(2) Inherent Viscosity

Using pellets to be supplied to an extruder as a material, inherent viscosity was calculated by (Equation 4) from the solution viscosity measured in orthochlorophenol at 25° C.:

Inherent viscosity: $\eta_{sp}/C = [\eta] + K[\eta]^2 \cdot C$ (Equation 4).

Here, $\eta_{sp}$ denotes (solution viscosity/solvent viscosity) −1, C denotes the mass (1.2 g/100 ml) of a dissolved monomer per 100 ml of a solvent, and K denotes Huggins constant (set to 0.343). The solution viscosity and the solvent viscosity were measured by an Ostwald viscometer.

(3) Concentration (M) of Catalytic Metal Element, Concentration (P) of Phosphorus Element and M/P Value A sample obtained from a base material film was melted by heating to the melting point +20° C. to obtain a circular disk, and then the concentration (M) of a catalytic metal element (M) and the concentration (P) of a phosphorus element remaining in a polyester were determined by fluorescent X-ray analysis. Herein, M and P are concentrations based on one unit (mol) of a repeating unit of the polyester. When the amount is determined, a calibration curve using fluorescent X-ray, which is determined from a sample in which the amount of each metal element was changed, was used.

When a film contains particles containing a metal component, the measurement was carried out after removing the particles. As the method of removing particles, a method of dissolving inn a good solvent heated to a temperature of 80 to 100° C., and performing a centrifugal separation operation to remove particles and to precipitate a polymer in the solution, followed by fluorescent X-ray analysis was used.

In the case of a laminated film, the measurement was carried out after isolation by scraping off each layer. The M/P value was calculated by using M and P obtained by the above method.

(4) Thickness and Layer Thickness

The total thickness of a base material film is determined by measuring thicknesses at five optional positions of a sample cut from the film using a dial gauge and averaging the thicknesses. When the thickness of each layer of a laminated film is measured, a micrograph of a cross section of a film was taken through transmitted light under the conditions of a magnification of 100 times using a metallurgical microscope Leica DMLM manufactured by Leica Microsystems, and then the thickness of each layer of the laminated film was measured.

(5) Crystallization Index (Xs, Xc) and Crystallization Index Parameter (ΔXsc)

5 mg of a sample of each layer was collected by scraping off each layer from the laminated film. Using a differential scanning calorimeter Model DSCII manufactured by Seiko Instruments Inc., the temperature was raised from −30 to 300° C. at a temperature raising rate of 20° C./min, and then the exothermic amount (Sc) upon crystallization and the endothermic amount (Sm) upon fusion were measured and a crystallization index (X) was calculated from (Equation 5). From a crystallization index (Xs) of a highly crystalline polyester layer and a crystallization index (Xc) of a polyester layer, a crystallization index parameter (ΔXsc) was calculated using (Equation 6):

Crystallization Index: $X = (Sm - Sc)/Sm \times 100$ (Equation 5),

Crystallization index parameter: $\Delta Xsc = Xs - Xc$ (Equation 6).

(6) Planar Orientation Coefficient (fn)

Using a sodium D line (wavelength; 589 nm) as a light source, a refractive index (Nx) in a longitudinal direction, a refractive index (Ny) in a width direction and a refractive index (Nz) in a thickness direction of the surface of a laminated film were measured by an Abbe refractometer, and then a planar orientation coefficient (fn) was calculated from (Equation 7):

Planar Orientation coefficient $fn = (Nx + Ny)/2 - Nz$ (Equation 7).

When the layer to be measured is not exposed to the surface, the measurement was carried out after the obstructive layer to be measured was exposed to the surface by scraping off using a fine paper film of #1,000 to #1,500 mesh.

(7) Contact angle with Water

A laminated film was allowed to stand in an atmosphere at a room temperature of 23° C. and humidity of 65% for 24 hours. Using distilled water stored under the same conditions, the contact angle was measured by a contact angle meter Model CA-D (manufactured by Kyowa Interface Science Co., Ltd.). Ten measured values were averaged.

(8) Stress at 500% Elongation and Tensile Elongation at Break at 80° C.

A sample measuring 150 mm in length and 10 mm in width was cut from a laminated film in a machine direction and a width direction and then a stress at 500% elongation was determined by measuring at a testing rate of 100 mm/min in an atmosphere at 80° C. in accordance with ASTM-D-882-81 (Method A). Under the same conditions, a tensile elongation at break of the sample was also measured.

(9) Haze

Haze of a laminated film was measured by a haze meter STP-H-2 manufactured by Nippon Seimitsu Kogaku Co. in accordance with JIS-K-6714 (2001 Model).

(10) Mold Releasability

A transfer foil and a resin were integrally formed under the conditions described in the examples described hereinafter using a cup type vacuum forming machine, and then peelability upon removal of a base material film from a formed article was evaluated according to the following criteria. Samples are evaluated "Pass" when rated as "A" or "B." Using a cup having a diameter of 50 mm, formation is carried put under the conditions of a draw ratio of 1.0 and carried out under the best temperature conditions.

A: A base material film could be completely peeled, and surface defects of a formed article were not observed.

B: A base material film could be peeled, but some defects derived from peel unevenness are observed on the surface of a formed article.

C: It is difficult to peel a base material film. Even if the base material film can be peeled, many defects derived from peel unevenness are observed on the surface of a formed article.

(11) Resistance to Organic Solvents 3 ml of an organic solvent was dropped on the surface of a base material film and, after standing for 6 hours, the solvent was completely removed to obtain a sample treated with the solvent. Haze of samples before and after treating with the solvent was measured by a haze meter STP-H-2 manufactured by Nippon Seimitsu Kogaku Co. in accordance with JIS-K-6714 (2001 Model). A Δhaze value was calculated by subtracting the haze value before treating with the solvent from the haze value after treating with the solvent and then evaluated according to the following criteria. Samples are evaluated "Pass" when rated as "A" or "B." Using four kinds of organic solvents such as ethyl acetate, methyl ethyl ketone, methyl isobutyl ketone and toluene, resistance to each organic solvent was evaluated.

A: Δhaze value was less than 5 to all four kinds of organic solvents.,

B: While Δhaze value was 5 or more and less than 10 to one or more kinds of organic solvents, Δhaze value was less than 5 to other organic solvents.

C: Δhaze value was 10 or more to one or more kinds of organic solvents.

(12) Printability

A gravure ink ("HiLamic®" manufactured by Dainichiseika Color & Chemicals Mfg. Co., Ltd., main solvent: toluene/methyl ethyl ketone/isopropyl alcohol, ink: 723B Yellow) containing a polyurethane-based resin as a main component was printed on the surface of a laminated film (yellow 50% area) and then dried at 50° C. Furthermore, a gravure ink ("HiLamic" manufactured by Dainichiseika Color & Chemicals Mfg. Co., Ltd., main solvent: toluene/methyl ethyl ketone/isopropyl alcohol, ink: 701R White) containing a polyurethane-based resin as a main component was printed on the surface of the film (white 50% area) and then dried at 70° C. As a printing plate, a 175 line: 35 μm solid plate was used. The state of the printed laminated film was visually evaluated in view of printing defects, turbidity and wrinkles. Samples are evaluated "Pass" when rated as "A" or "B."

A: Printing defects, wrinkles and turbidity are not observed.

B: While printing is carried out comparatively good, slight turbidity and very slight wrinkles are observed.

C: Printing quality is poor, and turbidity and wrinkles, which exert an adverse influence on printing defects or printing, are observed.

(13) Thermoformability

Using a cup type vacuum forming machine, a transfer foil was formed under the conditions of a temperature of 80 to 120° C. and then thermoformability was evaluated. Using a cup having a diameter of 50 mm, formation was carried out under the conditions of a draw ratio of 1.0. The state of the transfer foil was observed when formed under the best temperature conditions and evaluated according the following criteria. Samples are evaluated "Pass" when rated as "A" of "B."

A: A corner was also formed sharply and the thickness was uniform after formation.

B: Slight roundness was observed at a corner and the thickness was slightly nonuniform after formation.

C: The thickness was nonuniform after formation, and wrinkles and fractures occurred.

(14) General Evaluation

Based on the evaluation results of mold releasability, resistance to organic solvents, printability and thermoformability, evaluation was carried out according the following criteria. Samples are evaluated "Pass" when rated as "A" or "B."

A: All of mold releasability, resistance to organic solvents, printability and thermoformability were rated "A," and thus the resulting film can be preferably used as a film for a transfer foil.

B: While one or more items of mold releasability, resistance to organic solvents, printability and thermoformability were rated "B," other items were rated "A" and thus the resulting film can sufficiently support practical use as a film for a transfer foil.

C: At least one item of mold releasability, resistance to organic solvents, printability and thermoformability was rated "C" or three or more items of them were rated "B," and thus the resulting film cannot support practical use as a film for a transfer foil or it is difficult to use as a film for a transfer foil.

In the examples and the comparative examples, the following polyesters and particle masters were used.

(Polyethylene Terephthalate A (PET-A))

To a mixture of 100 parts by mass of dimethyl terephthalate and 60 parts by mass of ethylene glycol, 0.09 parts by mass (based oh the amount of dimethyl terephthalate) of magnesium acetate and 0.03 parts by mass (based on the amount of dimethyl terephthalate) of antimony trioxide were added, and then the ester exchange reaction was carried out by heating using a conventional method. To the ester exchange reaction product, an aqueous 85% phosphoric acid solution was added in the amount of 0.020% by mass based on the amount of dimethyl terephthalate and the mixture was transferred to a polycondensation reaction tank. The reaction sys-tem was gradually evacuated while heating and the polycondensation reaction was carried out at 290° C. under reduced pressure of 1 mmHg using a conventional method to obtain a polyethylene terephthalate resin having a melting point of 257° C. and inherent viscosity of 0.65 dl/g.
(Polyethylene Terephthalate B (PET-B))

Upon polymerization of PET-A, 6 parts, by mass of sodium dodecylbenzene sulfonate and 4 parts by mass of polyethylene glycol (molecular weight: 4,000) as antistatic agents, 0.10 parts by mass of "IRGANOX®" 1010 manufactured by Ciba Specialty Chemicals Corp. as an antioxidant and 6 parts by mass of aggregated silica particles (manufactured by Fuji Division Co., number average particle diameter: 2.5 μm) obtained by the method described hereinafter were further added to obtain a polyethylene terephthalate resin (inherent viscosity: 0.65 dl/g, melting point: 264° C.).

1 equivalent (based on one equivalent of aggregated silica particles: silicon tetrachloride) of oxygen and 1 equivalent (based on one equivalent of aggregated silica particles: silicon tetrachloride) of hydrogen were vaporized in a vaporizer and then hydrolysis was carried out in an oxyhydrogen flame at 1,000° C. to obtain silicon oxide particles. Furthermore, the silicon oxide particles thus obtained were ground by a wet sand mill using beads having a diameter of 0.5 mm to obtain an aggregated silica having a desired number average particle diameter.
(Isophthalic acid copolymerized polyterephthalate C (PET-C))

In the same manner as in the case of PET-A, except that 100 parts by mass of a mixture of 89 mol % of dimethyl terephthalate and 11 mol % of dimethyl isophthalate was used in place of 100 parts by mass of dimethyl terephthalate, isophthalic acid (11 mol %) copolymerized polyterephthalate (inherent viscosity: 0.60 dl/g, melting point: 229° C.) was obtained.
(Isophthalic acid copolymerized polyterephthalate D (PET-D))

In the same manner as in the case of PET-A, except that 100 parts by mass of a mixture of 82.5 mol % of dimethyl terephthalate and 17.5 mol % of dimethyl isophthalate was used in place of 100 parts by mass of dimethyl terephthalate, isophthalic acid (17.5 mol %) copolymerized polyterephthalate (inherent viscosity: 0.58 dl/g, melting point: 223° C.) was obtained.
(1,4-cyclohexane dimethanol Copolymerized Polyterephthalate (PET-E)]

"6763" (melting point: 190° C. inherent viscosity 0.72) manufactured by Eastman Chemical Company was used. The copolymerization ratio of 1,4-cyclohexanedimethanol was 30 mol %.
(Polyethylene Naphthalate A (PEN-A))

In the same manner as in the case of PET-A, except that 100 parts by mass of dimethyl 2,6-naphthalenedicarboxylate was used in place of 100 parts by mass of dimethyl terephthalate, a polyethylene naphthalate resin melting point: 270° C., inherent viscosity: 0.69 dl/g) was obtained.
(Polybutylene Terephthalate A (PBT-A))

"Toraycoh®" 1200S: polybutylene terephthalate (melting point: 224° C., inherent viscosity: 1.26 dl/g) manufactured by Toray Industries Inc. was used.
(Polybutylene Terephthalate B (PBT-B))

An antioxidant, an antistatic agent and aggregated silica particles used in PET-B were added to "Toraycon®" 1200S: polybutylene terephthalate (melting point: 224° C., inherent viscosity: 1.26 dl/g) manufactured by Toray Industries Inc. according to the same formulation as in the case of PET-B, and then the resulting mixture was supplied to a vent type twin screw extruder (L/D=35) set at 250° C. The resin melted by an extruder was extruded through a spinneret having a circular hole having a diameter of 5 mm, immediately quenched by cooling water at 10° C. and then the resulting gut-shaped resin was cut at intervals of 4 mm to obtain a polybutylene terephthalate pellet (melting point: 228° C., inherent viscosity: 1.26 dl/g).
(Polypropylene Terephthalate A (PPT-A))

"CORTERRA®" CP509201: polypropylene terephthalate (inherent viscosity: 0.9 dl/g, melting point: 222° C.) manufactured by Shell Chemicals Limited was used.

Example 1

Polyesters used in a polyester layer were mixed according to the formulation shown in Table 1. Furthermore, 0.1% by mass of stearylphosphoric acid ("ATJK STAB®" AX-71 manufactured by ADEKA CORPORATION) was separately added and then supplied to a vent type twin screw extruder (L/D=36). The supplied resin was melted at 280° C. and then passed through two vacuum vent portions. The resin was passed through a leaf disk filter having filtration accuracy of 30 μm and then supplied to a multimanifold die. Polyesters used in a highly crystalline polyester layer were mixed according to the formulation shown in Table 1, supplied to a vent type twin screw extruder (L/D=36), melted at 250° C. and then passed through two vacuum vent portions. The resin was passed through a leaf disk filter having filtration accuracy of 30 μm and then supplied to a multimanifold die.

After each resin in the die was passed through a manifold, two kinds of resins were laminated so as to obtain a configuration of highly crystalline polyester layer/polyester layer/highly crystalline polyester layer, and then extruded into a sheet through a slit-shaped die. Electrostatic application was carried out on ends of the extruded sheet using needle-shaped edge pinning, and then the sheet was solidified with cooling by contacting with a casting drum whose surface is subjected to satin finishing. The surface temperature of the casting drum was adjusted to 55° C. As a result, the resulting base material film is a film in which one layer of a highly crystalline polyester layer has a thickness of 10 μm and the entire thickness of the film is 200 μm. The M/P value of the polyester layer was 0.99.

The surface of the highly crystalline polyester layer as one surface of the resulting base material film was subjected to a corona discharge treatment, and then a coating agent with the following copolymerization composition of 10% by mass of a long-chain alkyl acrylate resin, 6% by mass of isopropyl alcohol, 8% by mass of butylcellosolve and 76% by mass of water was coated in a thickness of 1.5 μm (corresponding to a solid content) using a bar coater to obtain a laminated film.

As the long-chain alkyl acrylate resin, a resin obtained by polymerizing a composition containing 39% by mass of methyl methacrylate, 58% by mass of dodecyl methacrylate, 1% by mass of acrylic acid and 2% by mass of an anionic reactive emulsifier was used. As the an-ionic reactive emulsifier, "ELEMINOL®" JS-2 manufactured by Sanyo Chemical Industry Ltd. was used.

On the surface of the release layer of the laminated film, a top coat layer, a printing layer and an adhesive layer were formed in this order to obtain a transfer foil. As the top coat layer, a 60 μm thick layer was formed using an ultraviolet curable acrylic resin ("LAROMER®" LR8983 manufactured by BASF Japan Ltd.). As the printing layer, a 70 μm thick layer was formed using a polyurethane-based resin gravure ink ("HiLamic®" manufactured by Dainichi-seika Color & Chemicals Mfg. Co., Ltd., main solvent: toluene/methyl ethyl ketone/isopropyl alcohol, ink: 723B Yellow/701R White). As the adhesive layer, a 100 μm thick layer was formed using an acrylonitrile-butadiene-styrene (ABS) copolymerized resin film (ABS film "Figlex®" manufactured by OKAMOTO Co.).

The resulting transfer foil was heated to a temperature of 80® C. and then formed into a cup-shaped formed article by a vacuum forming machine under the conditions of a temperature of 85® C. and a draw ratio of 1.0 using a cup convex mold having a diameter of 50 mm. Subsequently, an acrylonitrile-butadiene-styrene (ABS) copolymerized resin (ABS resin "Toyolac®" 930 manufactured by Toray Industries Inc.) heated to 280° C. was injected into the cup-shaped formed article. After ABS was solidified with cooling, the cup-shaped formed article was removed from the base material film and a top coat layer of the cup-shaped formed article was cured using ultraviolet light having a wavelength of 365 nm.

Example 2

In the same manner as in Example 1, except that the polyesters of the polyester layer and the highly crystalline polyester layer were mixed according to the formulation shown in Table 1 and the amount of stearylphosphoric acid was changed to 0.15% by mass, and also a single manifold type die was used, a base material film with a configuration of highly crystalline polyester layer/polyester layer/highly crystalline polyester layer. The M/P value of the polyester layer of the resulting base material film was 0.75. The thickness of one highly crystalline polyester layer was 15 μm and the entire thickness was 100 μm.

A releasant prepared by mixing 100 parts by mass of an ultraviolet cationic curable silicone (Silicone "X-62-7655" manufactured by Shin-Etsu Chemical Co., Ltd.) with 1 part by mass of (Catalyst "CAT-7603" manufactured by Shin-Etsu Chemical Co., Ltd.) of a catalyst was coated on the surface of the resulting base material film contacted with the cast drum using a wire bar coating method, and then cured by irradiation with ultraviolet light to form a releasant layer. In the same manner as in Example 1, except for the above description, a laminated film was obtained.

In the same manner as in Example 1, a top coat layer, a printing layer and an adhesive layer were formed on the resulting laminated film to obtain a transfer foil. In the same manner as in Example 1, tests were carried out. As a result, the transfer foil showed good thermoformability.

Example 3

In the same manner as in Example 1, except that polyesters of the top coat layer, the polyester layer and the highly crystalline polyester layer were mixed according to the formulation shown in Table 1, the end electrostatic application method using needle-shaped edge pinning was replaced by an entire face electrostatic application method using a wire as a method of contacting with a casting drum, and a satin-finished casting drum was replaced by a mirror-finished casting drum, and also the surface of the highly crystalline polyester layer of the molten film was contacted with the casting drum and the melting temperature of the polyester layer and the temperature of the die were adjusted to 290° C., a base material film haying a structure of two kinds of two layers of polyester layer/highly crystalline polyester layer was obtained. The M/P value of the polyester layer of the resulting base material film was 0.99. The thickness of one highly crystalline polyester layer was 20 μm and the entire thickness was 120 μm.

An aqueous 10% solution of a silicone composition containing 49.5% by mass of an addition reaction silicone (DEHESIVE39005VP manufactured by Wacker Asahikasei Silicone Co., Ltd.), 49.5% by mass of DEHESIVE39006VP and 1% by mass of a catalyst (A-187 manufactured by Nippon Unicar Company Limited) was coated on the highly crystalline polyester layer of the resulting base material film to form a release layer having a thickness of 0.1 μm (corresponding to a solid content) using a wire bar coating method and thus a laminated film was obtained.

In the same manner as in Example 1, a top coat layer, a printing layer and an adhesive layer were formed on the highly crystalline polyester layer of the resulting laminated film to obtain a transfer foil. In the same manner as in Example 1, tests were carried out. As a result, the transfer foil was slightly inferior in printability but was an acceptable level, and also showed good thermoformability.

Example 4

In the same manner as in Example 1, except that the composition of the polyesters of the polyester layer and the highly crystalline polyester layer was changed as shown in Table 1, and the temperature of the casting drum was changed to 60° C., abase material film was obtained. The M/P value of the polyester layer of the resulting base material film was 0.99. The thickness of one highly crystalline polyester layer was 20 μm and the entire thickness was 250 μm. In the same manner as in Example 1, except that an aqueous 15% concentrated solution of a fluorine-based resin (Surflon® S-112 manufactured by Asahi Glass Co., Ltd.). was coated on the resulting base material film using a bar coater to form a release layer having a thickness of 0.1 μm (corresponding to a solid content), a laminated film was obtained.

In the same manner as in Example 1, a top coat layer, a printing layer and an adhesive layer were formed on the highly crystalline polyester layer of the resulting laminated film to obtain a transfer foil. In the same manner as in Example 1, tests were carried out. As a result, the transfer foil was slightly inferior in printability but was of an acceptable level, and also showed good thermoformability although slight wrinkles were observed after printing and drying, and also showed excellent thermoformability.

Example 5

In the same manner as in Example 1, except that the composition of the polyesters of the polyester layer and the highly crystalline polyester layer was changed as shown in Table 1 and the temperature of the casting drum was changed to 60° C., a laminated film was obtained. The M/P value of the polyester layer of the resulting base material film was 0.99. The thickness of one highly crystalline polyester layer was 5 μm and the entire thickness was 200 μm.

In the same manner as in Example 1, a top coat layer, a printing layer and an adhesive layer were formed on the highly crystalline polyester layer of the resulting laminated film to obtain a transfer foil. In the same manner as in Example 1, tests were carried out. As a result, the transfer foil was excellent in resistance to organic solvents and printability. Also, although slight roundness was observed in the corner of a formed article and the formed article was slightly inferior in thermoformability, it was of an acceptable level.

Example 6

In the same manner as in Example 1, except that the composition of the polyesters of the polyester layer and the highly crystalline polyester layer was changed as shown in Table 1, and the temperature of the casting drum was changed to 60° C., a base material film having a structure of two kinds of two layers of polyester layer/highly crystalline polyester layer was obtained. The surface of the highly crystalline polyester layer of the molten film was contacted with the casting drum. The M/P value of the polyester layer of the resulting base material film was 0.99. The thickness of one highly crystalline polyester layer was 5 μm and the entire thickness was 200 μm. In the same manner as in Example 1, a release layer was formed on the highly crystalline polyester layer of the resulting base material film to obtain a laminated film having a thickness of 200 μm.

In the same manner as in Example 1, a top coat layer, a printing layer and an adhesive layer were formed on the highly crystalline polyester layer of the resulting laminated film to obtain a transfer foil. In the same manner as in Example 1, tests were carried out. As a result, the transfer foil was excellent in resistance to organic solvents and printability. Also, although slight roundness was observed in the corner of a formed article and the formed article was slightly inferior in thermoformability, it was of an acceptable level.

Example 7

In the same manner as in Example 1, except that the composition of the polyesters of the polyester layer and the highly crystalline polyester layer was changed as shown in Table 1, an undrawn base material film was obtained. The resulting undrawn base material film was drawn at a draw ratio of 2.0 times in a longitudinal direction at a drawing temperature of 100° C., drawn at a draw ratio of 2.0 times in a width direction at a drawing temperature of 120° C., relaxed by 0.2% in a width direction at 230° C. and then subjected to a heat treatment for 5 seconds to obtain a drawn base material film. The planar orientation coefficient of the polyester film of the resulting drawn base material film was 0.068 and the M/P value of the polyester layer was 0.99. The thickness of one highly crystalline polyester layer was 5 μm and the entire thickness was 30 μm. In the same manner as in Example 1, a release layer, a top coat layer, a printing layer and an adhesive layer were formed. The resulting transfer foil was excellent in resistance to organic solvents and printability. Also, although slight roundness was observed in the corner of a formed article and the formed article was slightly inferior in thermoformability, it was of an acceptable level.

Comparative Example 1

In the same manner as in Example 1, a base material film was obtained. The M/P value of the polyester layer of the resulting base material film, was 0.99. The thickness of one highly crystalline polyester layer was 10 μm and the entire thickness was 200 μm. In the same manner as in Example 1, except that no release layer was formed, and a top coat layer, a printing layer and an adhesive layer were formed on the highly crystalline polyester layer of the base material film, a transfer foil was obtained. The resulting transfer foil was excellent in resistance to organic solvents, printability and thermoformability. However, the transfer foil was inferior in mold releasability since no release layer is formed, and thus peel stress during the peel step after transfer increased and a lot of peel marks due to peel unevenness of the transfer foil occurred.

Comparative Example 2

In the same manner as in Example 3, except that the composition of the polyesters of the polyester layer and the highly crystalline polyester layer was as shown in Table 1, the extrusion temperature of the polyester layer was set to 250° C., and the surface temperature of the casting drum was set to 60° C., a base material film was obtained. The M/P value of the polyester layer was 0.99. The thickness of one highly crystalline polyester layer was 100 μm and the entire thickness was 200 μm. In the same manner as in Example 1, no release layer was formed, a top coat layer, a printing layer and an adhesive layer were formed on the surface, which is contacted with the casting drum, of the base material film. The resulting laminated film was inferior in handleability since it curls while facing the highly crystalline polyester layer inward. Even when used as a transfer foil, poor formation is caused by wrinkles of the film since forming stress is low. Furthermore, the laminated film is inferior in mold releasability since no release layer is formed, and thus peel stress during the peel step after transfer increased and a lot of peel marks due to peel unevenness of the transfer foil occurred, and thermoformability deteriorated.

Comparative Example 3

In the same manner as in Example 2, except that the composition of the polyesters of the polyester layer and the highly crystalline polyester layer was as shown in Table 1, and the extrusion temperature of the polyester layer was set to 230° C., a base material film was obtained. The M/P value of the polyester layer of the base material film was 0.99. The thickness of one highly crystalline polyester layer was 100 μm and the entire thickness was 650 μm. In the same manner as in Example 1, a top coat layer, a printing layer and an adhesive layer were, formed on the surface, which is contacted with the casting drum, of the base material film. The resulting transfer foil was excellent in thermoformability, but was inferior in resistance to organic solvents since the surface layer does not have sufficient crystallinity of the surface layer. The transfer foil cannot support practical use as a transfer foil since printing distortion is recognized.

Comparative Example 4

In the same manner as in Example 2, except that the composition of the polyester layer was as shown in Table 1 and the extrusion temperature of the polyester layer was changed to 230° C., and also the surface temperature of the casting drum was charged to 20° C., a single layered film whose base material film is composed only of a polyester layer, a single layered base material film having a thickness of 150 μm was obtained. In the same manner as in Example 1, except that no release layer was formed on the surface, which is contacted with the casting drum, of the single layered base material film, a top coat layer, a printing layer and an adhesive layer were formed to obtain a transfer foil. The resulting transfer foil was excellent in thermoformability, but was inferior in resistance to organic solvents since no high crystalline polyester layer is formed. The transfer foil cannot support use as a transfer foil since printing distortion is recognized

TABLE 1

|  |  |  | Example 1 | Example 2 | Example 3 | Example 4 |
|---|---|---|---|---|---|---|
|  |  | Film configuration | A/B/A | A/B/A | A/B | A/B/A |
| Polyester layer | Composition (% by mass) |  | PET-A (95) PBT-A (5) | PET-A (80) PBT-A (20) | PEN-A (46) PBT-A (50) PET-A (4) | PET-A (95) PPT-A (5) |
|  | Dicarboxylic acid component | NDC amount + DMT amount (% by mass) | 100 | 100 | 100 | 100 |
|  |  | Others (% by mass) | 0 | 0 | 0 | 0 |
|  | Glycol component | EG amount (% by mass) | 95 | 80 | 50 | 95 |
|  |  | PD amount + BD amount (% by mass) | 5 | 20 | 50 | 5 |
|  | Melting point Tm(° C.) |  | 255 | 250 | 263 | 255 |
|  | Glass transition temperature (° C.) |  | 77 | 70 | 74 | 78 |
|  | Layer thickness (μm) |  | 180 | 70 | 100 | 210 |
|  | Crystallization index Xc |  | 0 | 0 | 0 | 0 |
|  | Planar orientation coefficient fn |  | 0.000 | 0.001 | 0.002 | 0.001 |
| High crystalline polyester layer | Composition (% by mass) |  | PBT-A (96) PBT-B (4) | PBT-A (86) PET-C(10) PBT-B (4) | PBT-A (91) PET-C(5) PBT-B (4) | PBT-A (91) PET-D(5) PBT-B (4) |
|  | Dicarboxylic acid component | NDC amount + DMT amount (% by mass) | 100 | 99 | 99.5 | 99 |
|  |  | DMI amount (% by mass) | 0 | 1 | 0.5 | 1 |
|  |  | Others (% by mass) | 0 | 0 | 0 | 0 |
|  | Glycol component | EG amount (% by mass) | 0 | 10 | 5 | 5 |
|  |  | PD amount + BD amount (% by mass) | 100 | 90 | 95 | 95 |
|  | Melting point Tm(° C.) |  | 224 | 222 | 223 | 223 |
|  | Crystallinity parameter ΔTcg(° C.) |  | 13 | 14 | 13 | 14 |
|  | Layer thickness (μm) |  | 10 | 15 | 20 | 20 |
|  | Crystallization index Xs |  | 13 | 9 | 10 | 9 |
|  | Planar orientation coefficient fn |  | 0.001 | 0.000 | 0.002 | 0.001 |
| Release layer | Composition |  | Long-chain alkyl acrylate | Ultraviolet curable silicone | Addition reactive silicone | Fluororesin |
|  | Layer thickness (μm) |  | 1.5 | 1.0 | 0.1 | 0.1 |
|  | Contact angle with water (°) |  | 89 | 110 | 108 | 110 |
| Evaluation | Base material film thickness (μm) |  | 200 | 100 | 120 | 250 |
|  | Crystallization index parameter ΔXsc |  | 13 | 9 | 10 | 9 |
|  | F500 value (MPa) | MD direction | 22 | 22 | 19 | 21 |
|  |  | TD direction | 24 | 24 | 20 | 23 |
|  | Elongation at break (%) | MD direction | 950 | 1100 | 860 | 900 |
|  |  | TD direction | 1000 | 1200 | 880 | 950 |
|  | Haze (%) |  | 5 | 4 | 4 | 5 |
|  | Mold releasability |  | A | A | A | A |
|  | Resistance to organic solvents |  | A | A | A | A |
|  | Printability |  | A | A | A | A |
|  | Thermoformability |  | A | A | A | A |
|  | General evaluation |  | A | A | A | A |

|  |  |  | Example 5 | Example 6 | Example 7 |
|---|---|---|---|---|---|
|  |  | Film configuration | A/B/A | A/B | A/B/A |
| Polyester layer | Composition (% by mass) |  | PET-A (95) PBT-A (5) | PET-A (100) | PEN-A (80) PBT-A (20) |
|  | Dicarboxylic acid component | NDC amount + DMT amount (% by mass) | 100 | 100 | 100 |
|  |  | Others (% by mass) | 0 | 0 | 0 |
|  | Glycol component | EG amount (% by mass) | 95 | 100 | 80 |
|  |  | PD amount + BD amount (% by mass) | 5 | 0 | 20 |
|  | Melting point Tm(° C.) |  | 255 | 257 | 255 |
|  | Glass transition temperature (° C.) |  | 77 | 80 | 70 |
|  | Layer thickness (μm) |  | 190 | 180 | 20 |
|  | Crystallization index Xc |  | 0 | 0 | 30 |
|  | Planar orientation coefficient fn |  | 0.002 | 0.000 | 0.068 |
| High crystalline polyester layer | Composition (% by mass) |  | PBT-A (96) PBT-B (4) | PBT-A (96) PET-B (4) | PBT-A (96) PET-B (4) |
|  | Dicarboxylic acid component | NDC amount + DMT amount (% by mass) | 100 | 100 | 100 |
|  |  | DMI amount (% by mass) | 0 | 0 | 0 |
|  |  | Others (% by mass) | 0 | 0 | 0 |
|  | Glycol component | EG amount (% by mass) | 0 | 0 | 0 |
|  |  | PD amount + BD amount (% by mass) | 96 | 100 | 100 |
|  | Melting point Tm(° C.) |  | 224 | 224 | 224 |
|  | Crystallinity parameter ΔTcg(° C.) |  | 13 | 13 | 13 |
|  | Layer thickness (μm) |  | 5 | 10 | 5 |

TABLE 1-continued

|  |  |  |  |  |  |
|---|---|---|---|---|---|
|  | Crystallization index Xs |  | 14 | 13 | 35 |
|  | Planar orientation coefficient fn |  | 0.001 | 0.001 | 0.071 |
| Release layer | Composition |  | Long-chain alkyl acrylate | Long-chain alkyl acrylate | Long-chain alkyl acrylate |
|  | Layer thickness (μm) |  | 1.0 | 1.0 | 1.5 |
|  | Contact angle with water (°) |  | 87 | 86 | 89 |
| Evaluation | Base material film thickness (μm) |  | 200 | 200 | 30 |
|  | Crystallization index parameter ΔXsc |  | 14 | 13 | 5 |
|  | F500 value (MPa) | MD direction | 22 | 29 | Not drawn |
|  |  | TD direction | 24 | 30 | Not drawn |
|  | Elongation at break (%) | MD direction | 950 | 930 | 480 |
|  |  | TD direction | 950 | 1000 | 470 |
|  | Haze (%) |  | 4 | 5 | 1 |
|  | Mold releasability |  | A | A | A |
|  | Resistance to organic solvents |  | A | A | A |
|  | Printability |  | A | A | A |
|  | Thermoformability |  | B | B | B |
|  | General evaluation |  | B | B | B |

|  |  |  | Comparative Example 1 | Comparative Example 2 | Comparative Example 3 | Comparative Example 4 |
|---|---|---|---|---|---|---|
|  | Film configuration |  | A/B/A | A/B | A/B/A | Single film |
| Polyester layer | Composition (% by mass) |  | PET-A (95) PBT-A (5) — | PET-C (100) — — | PET-A (91) PBT-A (5) PET-B (4) | PET-E (96) PPT-B (4) — |
|  | Dicarboxylic acid component | NDC amount + DMT amount (% by mass) | 100 | 89 | 100 | 100 |
|  |  | Others (% by mass) | 0 | 11 | 0 | 0 |
|  | Glycol component | EG amount (% by mass) | 95 | 100 | 95 | 67 |
|  |  | PD amount + BD amount (% by mass) | 5 | 0 | 5 | 4 |
|  | Melting point Tm(° C.) |  | 255 | 229 | 255 | 190 |
|  | Glass transition temperature (° C.) |  | 77 | 78 | 77 | 81 |
|  | Layer thickness (μm) |  | 180 | 100 | 450 | 150 |
|  | Crystallization index Xc |  | 0 | 0 | 0 | 0 |
|  | Planar orientation coefficient fn |  | 0.000 | 0.002 | 0.002 | 0.001 |
| High crystalline polyester layer | Composition (% by mass) |  | PBT-A (96) PBT-B (4) — | PBT-A (96) PET-B (4) — | PBT-A (36) PET-D (60) PBT-B (4) | — — — |
|  | Dicarboxylic acid component | NDC amount + DMT amount (% by mass) | 100 | 100 | 89.5 | — |
|  |  | DMI amount (% by mass) | 0 | 0 | 10.5 | — |
|  |  | Others (% by mass) | 0 | 0 | 0 | — |
|  | Glycol component | EG amount (% by mass) | 0 | 0 | 60 | — |
|  |  | PD amount + BD amount (% by mass) | 100 | 100 | 40 | — |
|  | Melting point Tm(° C.) |  | 224 | 224 | 202 | — |
|  | Crystallinity parameter ΔTcg(° C.) |  | 13 | 14 | 46 | — |
|  | Layer thickness (μm) |  | 10 | 100 | 100 | — |
|  | Crystallization index Xs |  | 13 | 13 | 0 | — |
|  | Planar orientation coefficient fn |  | 0.001 | 0.001 | 0.000 | — |
| Release layer | Composition |  | — | — | Ultraviolet Curable silicon | — |
|  | Layer thickness (μm) |  | — | — | 1.0 | — |
|  | Contact angle with water (°) |  | 68 | 69 | 109 | 66 |
| Evaluation | Base material film thickness (μm) |  | 200 | 200 | 650 | 150 |
|  | Crystallization index parameter ΔXsc |  | 12 | 13 | 0 | — |
|  | F500 value (MPa) | MD direction | 22 | 22 | 22 | 12 |
|  |  | TD direction | 24 | 23 | 24 | 13 |
|  | Elongation at break (%) | MD direction | 950 | 950 | 950 | 550 |
|  |  | TD direction | 1000 | 970 | 100 | 600 |
|  | Haze (%) |  | 4 | 9 | 21 | 10 |
|  | Mold releasability |  | C | C | B | C |
|  | Resistance to organic solvents |  | A | A | C | C |
|  | Printability |  | A | A | C | C |

TABLE 1-continued

| | | | | |
|---|---|---|---|---|
| Thermoformability | A | C | B | A |
| General evaluation | C | C | C | C |

Abbreviations in the table are as follows.
PET: Polyethylene terephthalate
PBT: Polybutylene terephthalate
PEN: Polyethylene naphthalate
PPT: Polypropylene terephthalate
NDC amount: Proportion (% by mass) of the 2,6-naphthalenedicarboxylic acid component (% by mass) in the entire dicarboxylic acid component
DMT amount: Proportion (% by mass) of the terephthalic acid component in the entire dicarboxylic acid component
DMI amount: Proportion (% by mass) of the isophthalic acid component in the entire dicarboxylic acid component
EG amount: Proportion (% by mass) of the ethylene glycol component in the entire glycol component
PD amount: Proportion (% by mass) of the 1,3-propanediol component of the entire glycol component
BD amount: Proportion (% by mass) of the 1,4-butanediol component in the entire glycol component
F500 amount: Stress at 500% elongation at 80° C.
A/B/A: Film with a configuration of two or more kinds of three layers in which a highly crystalline polyester layer, a polyester layer and a highly crystalline polyester layer are laminated in this order in a thickness direction on the surface.
A/B: Film with a configuration of two or more kinds of two layers in which a polyester layer and a highly crystalline polyester layer are laminated in this order in a thickness direction on the surface.

INDUSTRIAL APPLICABILITY

The laminated film satisfies all of releasability, printability and thermoformability required of a transfer foil film for deep draw forming. Furthermore, the laminated film is a laminated film having excellent cost performance as compared with a conventional film for a transfer foil like a laminated film as described in Japanese Unexamined Patent Publication (Kokai) No. 2004-188708. For these reasons, the laminated film can be preferably used as the surface of components having a complicated shape, for example, a film for a transfer foil of automotive interior/exterior components, bathroom panels, components of household electrical appliances and OA product components.

The invention claimed is:

1. A polyester laminated film comprising:
   at least a polyester layer comprising a polyester, and
   a highly crystalline polyester layer comprising a highly crystalline polyester having a crystallinity parameter ΔTeg of 35° C. or lower,
   wherein both the polyester layer and the highly crystalline polyester layer have a planar orientation coefficient of 0.00 to 0.03, and
   the difference between a crystallization index of the polymer constituting the polyester layer and the crystallization index of the highly crystalline polyester is ≧4%, and wherein the laminated film has a tensile elongation at break at 80° C. of 500% or more and stress at 500% elongation is 10 to 50 MPa.

2. The polyester laminated film according to claim 1, wherein a glass transition temperature of a polyester constituting the polyester layer is 60 to 78° C.

3. The polyester laminated film according to claim 1, wherein haze is 10% or less.

4. The polyester laminated film according to claim 1, wherein the highly crystalline polyester layer is laminated on both surfaces of the polyester layer.

5. A transfer foil comprising a polyester laminated film according to claim 1, a top coat layer, a printing layer and an adhesive layer, wherein the top coat layer, the printing layer and the adhesive layer are formed on one side of the highly crystalline polyester layer of the polyester laminated film in this order.

* * * * *